United States Patent [19]

Donohue

[11] Patent Number: 4,602,602
[45] Date of Patent: Jul. 29, 1986

[54] CONTROL DEVICE INTERCONNECTING THROTTLE VALVE, EXHAUST VALVE, AND SPARK TIMING LINKAGES

[75] Inventor: James A. Donohue, Pewaukee, Wis.

[73] Assignee: Outboard Marine Corporation, Waukegan, Ill.

[21] Appl. No.: 635,172

[22] Filed: Jul. 27, 1984

[51] Int. Cl.⁴ .............................................. F02D 37/02
[52] U.S. Cl. .................... 123/413; 123/323; 74/860
[58] Field of Search ............... 123/413, 395, 400, 403, 123/406, 323; 74/860

[56] References Cited

U.S. PATENT DOCUMENTS

| | | | |
|---|---|---|---|
| 2,058,401 | 10/1936 | Blue | 123/413 |
| 2,103,348 | 12/1937 | Boyce | 123/413 |
| 2,635,595 | 4/1953 | Raleigh | 123/403 |
| 3,199,498 | 8/1965 | Scholtyssek | 123/323 |
| 3,769,949 | 11/1973 | Elingsen | 123/413 |
| 3,807,372 | 4/1974 | Garcea | 123/413 |
| 3,896,913 | 7/1975 | Maruoka et al. | 123/421 |
| 4,100,737 | 7/1978 | Sugihara | 60/292 |
| 4,492,198 | 1/1985 | Okumura | 123/413 |
| 4,528,954 | 7/1985 | Slattery | 123/413 |

Primary Examiner—Andrew M. Dolinar
Attorney, Agent, or Firm—Michael, Best & Friedrich

[57] ABSTRACT

A control device for a spark ignition internal combustion engine, the engine including a throttle valve, an exhaust valve, and a spark timing device, the control device comprising a first linkage adapted to be operatively connected to the throttle valve, a second linkage adapted to be operatively connected to the exhaust valve, a third linkage adapted to be operatively connected to the spark timing device, and a control linkage interconnecting the first, second, and third linkages for providing coordinated control of the throttle valve, the exhaust valve, and the spark timing device.

23 Claims, 6 Drawing Figures

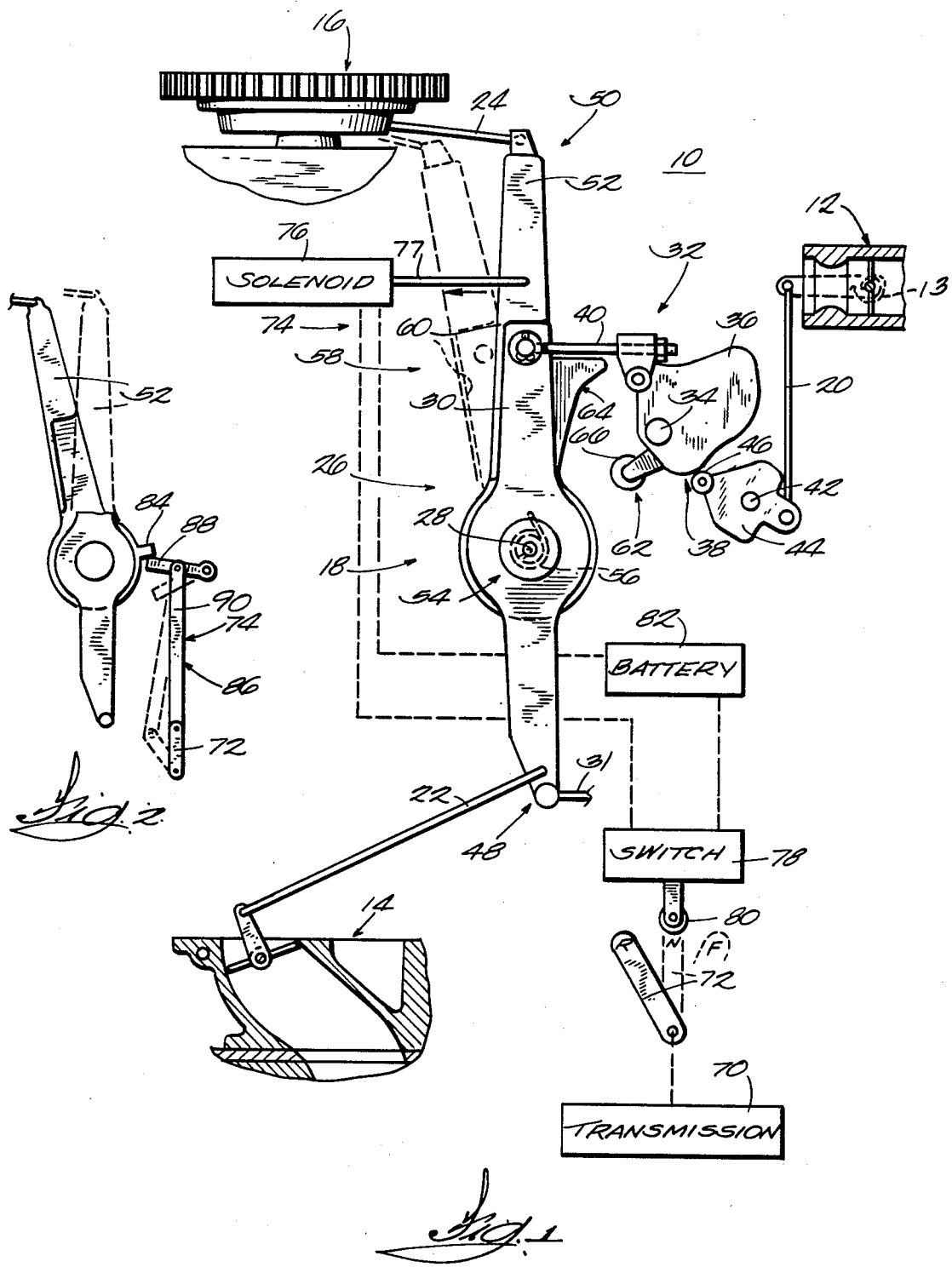

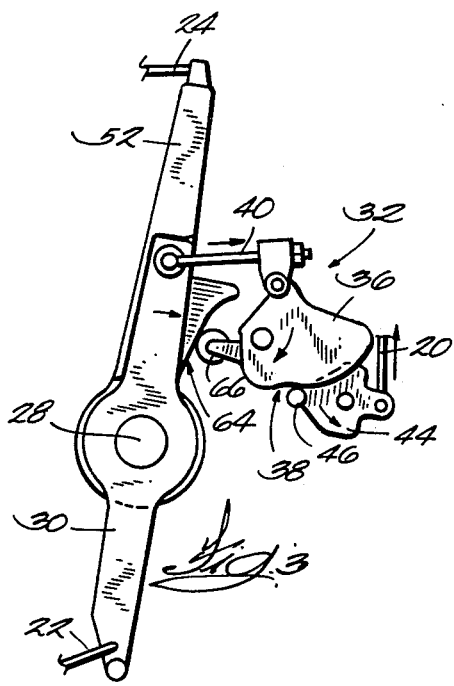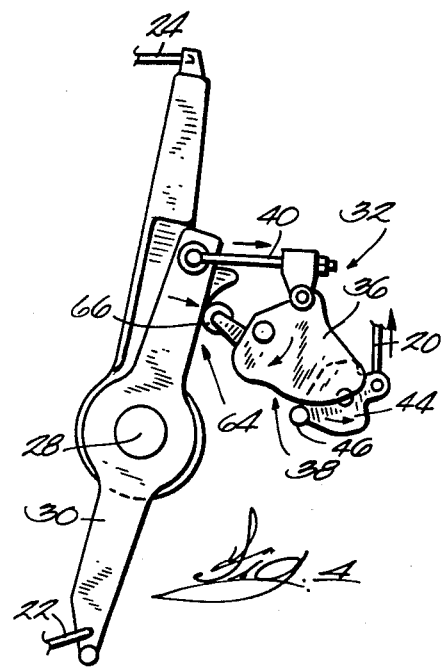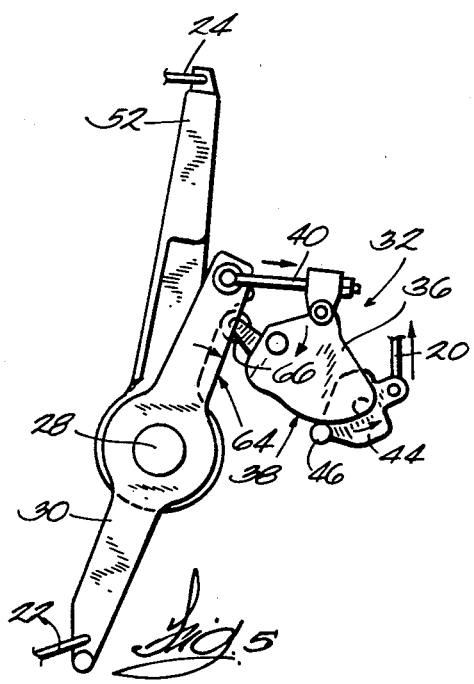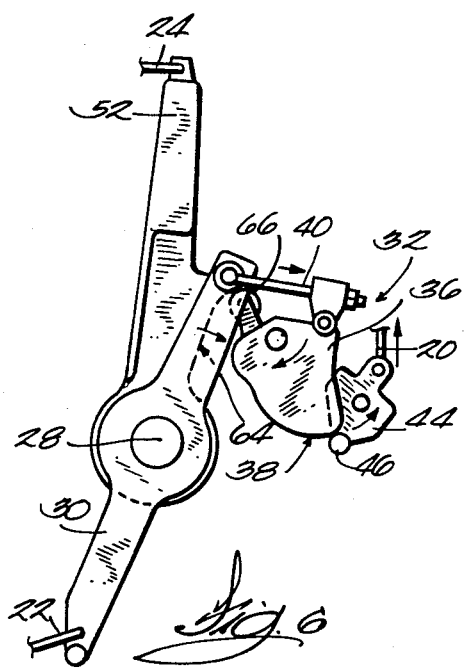

CONTROL DEVICE INTERCONNECTING THROTTLE VALVE, EXHAUST VALVE, AND SPARK TIMING LINKAGES

BACKGROUND OF THE INVENTION

The invention relates to internal combustion engines and, more particularly, to devices for controlling the throttle valve, exhaust valve, and spark timing linkages of an internal combustion engine.

Attention is directed to the following U.S. Patents:
Stanton U.S. Pat. No. 1,740,790, issued Dec. 24, 1929;
Walker U.S. Pat. No. 3,195,529, issued July 20, 1965;
May U.S. Pat. No. 3,234,924, issued Feb. 15, 1966;
Walker U.S. Pat. No. 3,368,345, issued Feb. 13, 1968;
Warren U.S. Pat. No. 3,577,727, issued May 4, 1971;
Elingsen U.S. Pat. No. 3,769,949, issued Nov. 6, 1973;
Kolody U.S. Pat. No. 3,783,847, issued Jan. 8, 1974;
Hause U.S. Pat. No. 3,792,630, issued Feb. 19, 1974;
U.s. Pat. No. 3,896,913, issued July 29, 1975;
Konno U.S. Pat. No. 4,008,697, issued Feb. 22, 1977;
Harada et al., U.S. Pat. No. 4,048,966, issued Sept. 20, 1977;
Frahm U.S. Pat. No. 4,071,002, issued Jan. 31, 1978; and
Sugihara U.S. Pat. No. 4,100,737, issued July 18, 1978.

Attention is also directed to the following co-pending U.S. patent applications:
Flaig application Ser. No. 524,532, filed Aug. 19, 1983, now U.S. Pat. No. 4,528,953 and entitled "Throttle and Timing Linkage;" and
Wenstadt application Ser. No. 541,566, filed Oct. 13, 1983 and entitled "Timing and Throttle Linkage."

SUMMARY OF THE INVENTION

The invention provides a control device for a spark ignition internal combustion engine, the engine including a throttle valve, an exhaust valve, and a spark timing device, the control device comprising a first linkage adapted to be operatively connected to the throttle valve, a second linkage adapted to be operatively connected to the exhaust valve, a third linkage adapted to be operatively connected to the spark timing device, and means interconnecting the first, second, and third linkages for providing coordinated control of the throttle valve, the exhaust valve, and the spark timing device.

In one embodiment, the throttle valve is operable between a minimum opening and a maximum opening, and the means interconnecting the first, second, and third linkages includes means for opening the exhaust valve from a minimum opening to a maximum opening as the throttle valve is opened from minimum opening to maximum opening.

In one embodiment, the means interconnecting the first, second, and third linkages includes means for advancing the spark timing from a minimum value to a maximum value as the throttle valve is increasingly opened from minimum opening to a point between minimum and maximum opening, and for retarding the spark timing from the maximum value to a value less than the maximum value as the throttle valve is further increasingly opened from the point between minimum and maximum opening to maximum opening.

In one embodiment, the engine further includes a reversible transmission operable between forward, neutral, and reverse positions, and the control device further comprises means for retarding the spark timing to a value less than the minimum value when the transmission is in the neutral position.

The invention also provides a control device for a spark ignition internal combustion engine, the engine including a throttle valve, an exhaust valve, and a spark timing device, the control device comprising a first linkage adapted to be operatively connected to the throttle valve, a second linkage adapted to be operatively connected to the exhaust valve, a third linkage adapted to be operatively connected to the spark timing device, and means interconnecting the first, second, and third linkages for providing coordinated control of the throttle valve, the exhaust valve, and the spark timing device. The means interconnecting the first, second, and third linkages includes a first pivot on the engine, a throttle arm pivotally connected to the first pivot and operatively connected to the second linkage such that rotation of the throttle arm in one rotational direction causes the exhaust valve to be increasingly opened from a minimum opening to a maximum opening, and means operatively connecting the throttle arm to the first linkage such that rotation of the throttle arm in the one rotational direction causes the throttle valve to be increasingly opened from a minimum opening to a maximum opening.

In one embodiment, the throttle arm is rotatable in the one rotational direction between first, second, and third successive positions, the throttle valve and the exhaust valve being at minimum opening when the throttle arm is in the first position and being at maximum opening when the throttle arm is in the third position, and the means interconnecting the first, second, and third linkages includes means for controlling the spark timing by advancing the spark timing from a minimum value to a maximum value as the throttle arm is moved from the first position to the second position, and retarding the spark timing from the maximum value to a value less than the maximum value as the throttle arm is moved from the second position to the third position.

In one embodiment, the means interconnecting the first, second, and third linkages includes a spark control arm pivotally connected to the first pivot and operatively connected to the third linkage such that rotation of the spark control arm in the one rotational direction advances the spark timing and rotation of the spark control arm in the opposite rotational direction retards the spark timing, means biasing the spark control arm in the one rotational direction, and means preventing rotation of the spark control arm beyond the throttle arm in the one rotational direction. Also, the means for controlling the spark timing includes means rotating the spark control arm, against the biasing means, in the opposite rotational direction relative to the throttle arm when the throttle arm is moved from the second position to the third position.

In one embodiment, the means operatively connecting the throttle arm to the first linkage includes a second pivot on the engine, a first lever having a cam surface and being pivotable about the second pivot, a link operatively connecting the first lever to the throttle arm such that rotation of the throttle arm in the one rotational direction causes the first lever to rotate about the second pivot, and a roller operatively connected to the first linkage and engaging the cam surface of the first lever.

In one embodiment, the spark control arm includes a cam surface thereon, and the means rotating the spark control arm includes a roller fixedly attached to the first lever and engageable with the cam surface on the spark control arm.

In one embodiment, the means biasing the spark control arm in the one rotational direction includes a helical spring wound around the first pivot and having an end fixedly attached to the spark control arm.

In one embodiment, the engine further includes a reversible transmission, and the control device further comprises a pivotally mounted shift lever movable between forward, neutral, and reverse positions and adapted to actuate the transmission, and means interconnecting the shift lever and the spark control arm for moving the spark control arm in the opposite rotational direction so as to retard the spark timing to a value less than the minimum value when the shift lever is in the neutral position.

In one embodiment, the means interconnecting the shift lever and the spark control arm includes a solenoid having an extendible and contractable solenoid arm pivotally connected to the spark control arm such that when the solenoid arm is contracted the spark control arm is moved so as to retard the spark timing to the value less than the minimum value, and a switch connected in an electrical circuit with the solenoid such that the solenoid arm contracts when the switch is closed and the solenoid arm extends when the switch is open, the switch being operably connected to the shift lever such that the switch is closed when the shift lever is in the neutral position and the switch is open when the shift lever is out of the neutral position.

The invention also provides a control device for a spark ignition internal combustion engine, the engine including a throttle valve and a spark timing device, the control device comprising a first linkage adapted to be operatively connected to the throttle valve, a third linkage adapted to be operatively connected to the spark timing device, and means interconnecting the first and third linkages for providing coordinated control of the throttle valve and the spark timing device, the means including a first pivot on the engine, a throttle arm pivotally connected to the first pivot and being rotatable in one rotational direction between first, second, and third successive positions, means operatively connecting the throttle arm to the first linkage such that rotation of the throttle arm in the one rotational direction causes the throttle valve to be increasingly opened from a minimum opening to a maximum opening, the throttle valve being at minimum opening when said throttle arm is in the first position and being at a maximum opening when the throttle arm is in the third position, and means for controlling the spark timing by advancing the spark timing from a minimum value to a maximum value as the throttle arm is moved from the first position to the second position, and by retarding the spark timing from the maximum value to a value less than the maximum value as the throttle arm is moved from the second position to the third position.

The invention also provides a control device for a spark ignition internal combustion engine, the engine including a spark timing device, a reversible transmission, and a pivotally mounted shift lever movable between forward, neutral, and reverse positions and adapted to actuate the transmission, the control device comprising a third linkage adapted to be operatively connected to the spark timing device, a first pivot on the engine, a spark control arm pivotally connected to the first pivot and operatively connected to the third linkage such that rotation of the spark control arm in one rotational direction advances the spark timing and rotation of the spark control arm in the opposite rotational direction retards the spark timing, and means interconnecting the shift lever and the spark control arm for moving the spark control arm in the opposite rotational direction so as to retard the spark timing when the shift lever is in the neutral position.

A principal feature of the invention is the provision of means for providing coordinated control of the throttle valve, exhaust valve, and spark timing device of an internal combustion engine.

Another principal feature of the invention is the provision of means for opening the exhaust valve from a minimum opening to a maximum opening as the throttle valve is opened from a minimum opening to a maximum opening.

Another principal feature of the invention is the provision of means for advancing the spark timing from a minimum value to a maximum value as the throttle valve is increasingly opened from minimum opening to a point between minimum and maximum opening, and for retarding the spark timing from the maximum value to a value substantially less than the maximum value as the throttle valve is further increasingly opened from the point between minimum and maximum opening to maximum opening.

Another principal feature of the invention is the provision of means for further retarding the spark timing when the transmission of the internal combustion engine is in neutral.

Other features and advantages of the invention will become apparent to those skilled in the art upon review of the following detailed description, claims, and drawings.

DESCRIPTION OF THE DRAWINGS

FIG. 1 is a side elevational view of an internal combustion engine (shown only in part) including a control device embodying the invention.

FIG. 2 is a reduced partial side view of the control device of FIG. 1 with an alternative embodiment of the means for retarding the spark in neutral.

FIG. 3 is a side view of the control device wherein the throttle arm is in a position for partial throttle valve opening.

FIG. 4 is a side view of the control device wherein the throttle arm is in a position for greater throttle valve opening than in FIG. 3.

FIG. 5 is a side view of the control device wherein the throttle arm is in a position for greater throttle valve opening than in FIG. 4.

FIG. 6 is a side view of the control device wherein the throttle arm is in a position for wide open throttle.

Before explaining one embodiment of the invention in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

Illustrated in FIG. 1 is an internal combustion engine 10 including a throttle valve 12, an exhaust valve 14, and a spark timing device 16. The spark timing device 16 is represented schematically and can be a device for positioning a trigger coil relative to a rotating magnet to change the spark timing. The throttle valve 12 is represented schematically as a butterfly valve. In the preferred embodiment, the throttle valve 12 includes suitable means, such as a spring 13, biasing the butterfly valve toward the closed position shown in FIG. 1. The exhaust valve 14 is also represented schematically as a butterfly valve.

The internal combustion engine 10 also includes a control device 18 for providing coordinated control of the throttle valve 12, the exhaust valve 14, and the spark timing device 16. The control device 18 comprises a first linkage 20 operatively connected to the throttle valve 12, a second linkage 22 operatively connected to the exhaust valve 14, and a third linkage 24 operatively connected to the spark timing device 16. Various suitable linkages 20, 22, and 24 can be employed. In the illustrated construction, the first linkage 20 is generally vertically oriented, and upward movement of the first linkage 20 from the position shown in FIG. 1 rotates and thereby opens the throttle valve 12. The second linkage 22 is generally horizontally oriented, and movement of the second linkage 22 generally to the left from the position shown in FIG. 1 rotates and thereby opens the exhaust valve 14. The third linkage 24 is generally horizontally oriented, and movement of the third linkage 24 to the left as shown in FIG. 1 retards the spark timing, and movement to the right advances the spark timing.

The control device 18 further comprises means 26 interconnecting the first, second, and third linkages 20, 22, and 24, respectively, for providing coordinated control of the throttle valve 12, the exhaust valve 14, and the spark timing device 16. While various suitable means 26 could be employed for this purpose, in the preferred embodiment, the means 26 includes a first pivot 28 on the engine 10 and a throttle arm 30 having upper and lower ends and being pivotally connected to the first pivot 28. Rotation of the throttle arm 30 about the first pivot 28 can be controlled by any suitable means. In the illustrated construction, such means is a push-pull cable 31 attached to the lower end of the throttle arm 30 and adapted to be controlled remotely of the engine 10.

The means 26 also includes means 32 operatively connecting the throttle arm 30 to the first linkage 20 such that clockwise rotation of the throttle arm 30 causes the throttle valve 12 to be increasingly opened. While various suitable means 32 could be employed for this purpose, in the preferred embodiment, the means 32 includes a second pivot 34 on the engine 10, a first lever 36 having a cam surface 38 and being pivotable about the second pivot 34, and a link 40 operatively connecting the first lever 36 to the upper end of the throttle arm 30 such that clockwise rotation of the throttle arm 30 causes clockwise rotation of the first lever 36 about the second pivot 34. The means 32 operatively connecting the throttle arm 30 to the first linkage 20 further includes a third pivot 42 on the engine 10, and a second lever 44 rotatably connected to the third pivot 42 and having one end pivotally connected to the first linkage 20 and an opposite end including a roller 46 engaging the cam surface 38 of the first lever 36. The roller 46 is biased against the cam surface 38 by the above described means biasing the throttle valve 12 toward the closed position.

As best shown in FIGS. 3 through 6, as the throttle arm 30 rotates in the clockwise direction about the first pivot 28, the link 40 connecting the throttle arm 30 to the first lever 36 causes the first lever 36 to also rotate in the clockwise direction. As the first lever 36 rotates in the clockwise direction, the cam surface 38 on the first lever 36 pushes downwardly on the roller 46 causing the second lever 44 to rotate in the counterclockwise direction so as to cause the first linkage 20 to move upwardly to open to throttle valve 12 (not shown in FIGS. 3–6). Thus, clockwise rotation of the throttle arm 30 causes the throttle valve 12 to be increasingly opened.

The means 26 interconnecting the first, second and third linkages 20, 22, and 24 also includes means 48 for opening the exhaust valve 14 from a minimum opening to a maximum opening as the throttle valve 12 is opened from minimum opening to maximum opening. While various suitable means 48 could be employed for this purpose, in the preferred embodiment, the means 48 includes the pivotal connection of the lower end of the throttle arm 30 to the second linkage 22 such that clockwise rotation of the throttle arm 30 causes the exhaust valve 14 to be increasingly opened.

The throttle arm 30 is rotatable in the clockwise direction between a first position (solid lines in FIG. 1) wherein the throttle valve 12 is at minimum opening, a second position (FIG. 3) wherein the throttle valve 12 is between minimum and maximum opening, and a third position (FIG. 6) wherein the throttle valve 12 is at maximum opening. The means 26 interconnecting the first, second, and third linkages 20, 22, and 24 also includes means 50 for controlling the spark timing by advancing the spark timing from a minimum value to a maximum value as the throttle arm 30 is moved from the first position to the second position, and retarding the spark timing from the maximum value to a value less than the maximum value as the throttle arm 30 is moved from the second position to the third position. While various suitable means 50 could be employed for this purpose, in the illustrated construction, the means 50 includes a spark control arm 52 rotatable about the first pivot 28, and means 54 biasing the spark control arm 52 in the clockwise direction. While various suitable means 54 could be employed for this purpose, in the preferred embodiment, the means 54 includes a helical spring 56 wound around the first pivot 28 and having its inner end fixedly attached to the first pivot 28 and its outer end fixedly attached to the spark control arm 52 so as to bias the spark control arm 52 in the clockwise direction.

The means 50 for controlling the spark timing also includes means 58 for preventing rotation of the spark control arm 52 beyond the throttle arm 30 in the clockwise direction. While various suitable means 58 could be employed for this purpose, in the preferred embodiment, the means 58 includes a ridge or shoulder 60 on the spark control arm 52. The ridge 60 abuts or engages the left edge of the throttle arm 30 as viewed in FIG. 1 and thus prevents the spark control arm 52 from moving beyond the throttle arm 30 in the clockwise direction.

The means 50 for controlling the spark timing further includes means 62 rotating the spark control arm 52, against the biasing force of the helical spring 56, in the counterclockwise direction relative to the throttle arm 30 when the throttle arm 30 is moved from the second position to the third position. While various suitable means 62 could be employed for this purpose, in the illustrated construction, the means 62 includes a cam surface 64 on the spark control arm 52, and a roller 66 fixedly attached to the first lever 36 and engageable with the cam surface 64 on the spark control arm 52.

When the throttle arm 30 is in the first or neutral position, as shown in solid lines in FIG. 1, the throttle valve 12 and the exhaust valve 14 are at minimum opening. The roller 66 is not in engagement with the cam surface 64, and, as the throttle arm 30 is moved in the clockwise direction, the spark control arm 52 will move along with the throttle arm 30, thereby advancing the spark timing, due to the biasing force of the helical spring 56.

When the throttle arm 30 reaches the second position, as shown in FIG. 3, the throttle valve 12 and exhaust valve 14 are between minimum and maximum opening. At this point, the roller 66 first comes into engagement with the cam surface 64. With any further clockwise rotation of the throttle arm 30, the roller 66 will push the spark control arm 52 in the counterclockwise direction relative to the throttle arm 30, thereby retarding the spark timing.

As can be seen in FIGS. 4, 5, and 6, as the throttle arm 30 moves beyond the second position in FIG. 3 to the third position (wide open throttle and maximum exhaust valve opening) in FIG. 6, the roller 62 moves further up the cam surface 64 due to the clockwise rotation of the first lever 34 and causes the spark control arm 52 to move further in the counterclockwise direction. At wide open throttle, in FIG. 6, the spark timing has been retarded substantially relative to the spark advance in FIG. 3.

As best shown in FIG. 1, the engine 10 also includes a reversible transmission 70 (represented schematically in FIG. 1) and a pivotally mounted shift lever 72 movable between forward, neutral, and reverse positions and adapted to actuate the transmission 70. The shift lever 72 is shown in the reverse position in solid lines in FIG. 1, and is shown in the forward and neutral positions in phantom.

In the preferred embodiment, the control device 18 further comprises means 74 interconnecting the shift lever 72 and the spark control arm 52 for moving the spark control arm 52 in the counterclockwise direction so as to retard the spark timing to a value less than the minimum value described above when the shift lever 72 is in the neutral position. While various suitable means 74 could be employed for this purpose, in the preferred embodiment, the means 74 includes a solenoid 76 having an extendible and retractable solenoid arm 77 pivotally connected to the spark control arm 52. When the solenoid 76 is energized, the solenoid arm 77 retracts and the spark control arm 52 is moved in the counterclockwise direction (as shown in phantom in FIG. 1) so as to retard the spark timing to a value less than the minimum value. When the solenoid is deenergized, the spark control arm 52 is free to move under the influence of the helical spring 56 as described above. The means 74 interconnecting the shift lever 72 and spark control arm 52 also includes a switch 78 operable between open and closed positions and connected in an electrical circuit with the solenoid 76 such that the solenoid 76 is energized when the switch 78 is closed and is deenergized when the switch 78 is open. In the illustrated construction, the switch 78 includes an actuator 80 that is normally biased outwardly of the switch 78 so that the switch 78 is open. When the actuator 80 is pressed inwardly into the switch 78, the switch 78 is closed. The switch 78 is positioned so that the actuator 80 is pushed inwardly into the switch 78 by the shift lever 72 when the shift lever 72 is in the neutral position. The electrical circuit can be powered by any suitable power means, such as a battery 82.

Thus, when the shift lever 72 is in the neutral position, the actuator 80 is pushed into the switch 78 to close the switch 78. This energizes the solenoid 76 and causes the solenoid arm 77 to retract, thereby pulling the spark control arm 52 in the counterclockwise direction (as shown in phantom in FIG. 1) to retard the spark timing to a value less than the minimum value. When the shift lever 72 is in the reverse position or the forward position, the switch 78 is open and the solenoid 76 is deenergized.

Illustrated in FIG. 2 is an alternative embodiment of the means 74 interconnecting the shift lever 72 and the spark control arm 52. In this alternative embodiment, the means 74 includes a tab 84 extending radially from the spark control arm 52 and a mechanical linkage 86 pivotally connected to the shift lever 72 and engageable with the tab 84 to move the spark control arm 52 in the counterclockwise direction so as to retard the spark timing. The mechanical linkage 86 includes a first arm 88 having one end pivotally connected to the engine 10 and an opposite end engageable with the tab 84 on the spark control arm 52. The linkage 86 also includes a second arm 90 having one end pivotally connected to the first arm 88 and another end pivotally connected to the shift lever 72.

When the shift lever 72 is in the neutral position, second arm 90 pushes the first arm 88 upwardly, thereby causing the end of the first arm 88 to engage the tab 84 on the spark control arm 52 and rotate the spark control arm 52 in the counterclockwise direction. This is shown in solid lines in FIG. 2. When the shift lever 72 is moved to either the reverse position or the forward position, the second arm 9 pulls the first arm 88 downwardly, thereby moving the end of the first arm 88 out of engagement with the tab 84 and allowing the spark control arm 52 to return to a position in engagement with the throttle arm 30. This is shown in phantom in FIG. 2 (the throttle arm 30 is not shown).

Various features of the invention are set forth in the following claims.

I claim:

1. A spark ignition internal combustion engine including a thottle valve, an exhaust valve movable between a substantially closed position affording minimum exhaust gas flow and a substantially open position affording maximum exhaust gas flow, a spark timing device, and a control mechanism comprising a pivot on the engine, a control member pivotally carried on said pivot, a throttle control linkage connected to said control member and to said throttle valve for controlling said throttle valve in response to pivotal movement of said control member, an exhaust control linkage connecting said control member to said exhaust valve for controlling exhaust valve movement between the open and closed positions in response to pivotal movement of said control member, and a spark timing control linkage connecting said control member to said spark timing device for control of said spark timing device in response to pivotal movement of said control member, said spark timing control linkage including a translatorily movable link connected between said control member and said spark timing device, whereby to provide for coordinated control of said throttle valve, said exhaust valve, and said spark timing device.

2. A control device as set forth in claim 1 wherein said throttle valve is operable between a minimum opening and a maximum opening, and wherein said exhaust control linkage includes means for opening said exhaust valve from a minimum opening to a maximum opening as said throttle valve is opened from minimum opening to maximum opening.

3. A control device as set forth in claim 1 wherein said throttle valve is operable between positions of minimum opening and maximum opening, and wherein said spark timing control linkage includes means for controlling the spark timing by advancing the spark timing from a minimum value to a maximum value as the throttle value is increasingly opened from minimum opening to a point between minimum and maximum opening, and by retarding the spark timing from said maximum value to a value less than said maximum value as the throttle valve is further increasingly opened from said point between minimum and maximum opening to maximum opening.

4. A control device as set forth in claim 3 wherein said exhaust control linkage includes means for opening said exhaust valve from a minimum opening to a maximum opening as said throttle valve is opened from minimum opening to maximum opening.

5. A control device as set forth in claim 4 wherein the engine further includes a reversible transmission operable between forward, neutral, and reverse positions, and wherein said control mechanism further comprises means for retarding the spark timing to a value less than said minimum value when said transmission is in said neutral position.

6. A spark ignition internal combustion engine including a throttle value, an exhaust valve, a spark timing device, and a control mechanism comprising means for providing coordinated control of said throttle valve, said exhaust valve, and said spark timing device, said control mechanism including a pivot on the engine in spaced relation to said timing device, a throttle arm pivotally carried by said pivot, an exhaust control linkage connecting said throttle arm and said exhaust valve such that rotation of said throttle arm in one rotational direction causes said exhaust valve to be increasingly opened from a minimum opening to a maximum opening, and a throttle control linkage including cam means operatively connecting said throttle arm to said throttle valve such that rotation of said throttle arm in said one rotational direction causes said throttle valve to be increasingly opened from a minimum opening to a maximum opening, and a spark timing control linkage connecting said throttle arm to said spark timing device.

7. A control device as set forth in claim 6 wherein said throttle arm is rotatable in said one rotational direction between first, second, and third successive positions, said throttle valve and said exhaust valve being at minimum opening when said throttle arm is in said first position and being at maximum opening when said throttle arm is in said third position, and wherein said spark timing control linkage includes means for controlling the spark timing by advancing the spark timing from a minimum value to a maximum value as said throttle arm is moved from said first position to said second position, and by retarding the spark timing from said maximum value to a value less than said maximum value as said throttle arm is moved from said second position to said third position.

8. A control device as set forth in claim 7 wherein said spark timing control linkage includes a spark control arm pivotally connected to said pivot and operatively connected to said spark timing control linkage such that rotation of said spark control arm in said one rotational direction advances the spark timing and rotation of said spark control arm in the opposite rotational direction retards the spark timing, means for biasing said spark control arm in said one rotational direction, means for preventing rotation of said spark control arm beyond said throttle arm in said one rotational direction, and means for rotating said spark control arm, against said biasing means, in said opposite rotational direction relative to said throttle arm when said throttle arm is moved from said second position to said third position.

9. A spark ignition internal combustion engine including a throttle valve, an exhaust valve, a spark timing device, and a control mechanism comprising a first linkage adapted to be operatively connected to said throttle valve, a second linkage operatively connected to said exhaust valve, a third linkage operatively connected to said spark timing device, and means interconnecting said first, second, and third linkages for providing coordinated control of said throttle valve, said exhaust valve, and said spark timing device, said means interconnecting said first, second, and third linkages including a first pivot on the engine, a throttle arm pivotally connected to said first pivot and rotatable in one rotational direction between first, second, and third successive positions, and operatively connected to said second linkage such that rotation of said throttle arm in said one rotational direction causes said exhaust valve to be increasingly opened from a minimum opening when said throttle arm is in said first position to a maximum opening when said throttle arm is in said third position, and means operatively connecting said throttle arm to said first linkage such that rotation of said throttle arm in said one rotational direction causes said throttle valve to be increasingly opened from a minimum opening when said throttle arm is in said first position to a maximum opening when said throttle arm is in said third position, said means operatively connecting said throttle arm to said first linkage including a second pivot on the engine, a lever having a cam surface and being pivotable about said second pivot, a link operatively connecting said lever to said throttle arm such that rotation of said throttle arm in said one rotational direction causes said lever to rotate about said second pivot, and a roller operatively connected to said first linkage and engaging said cam surface of said lever, and means for controlling the spark timing by advancing the spark timing from a minimum value to a maximum value as said throttle arm is moved from said first position to said second position, and by retarding the spark timing from said maximum value to a value less than said maximum value as said throttle arm is moved from said second position to said third position, said means for controlling the spark timing including a spark control arm pivotally connected to said first pivot and operatively connected to said third linkage such that rotation of said spark control arm in said one rotational direction advances the spark timing and rotation of said spark control arm in the opposite rotational direction retards the spark timing, means biasing said spark control arm in said one rotational direction, means preventing rotation of said spark control arm beyond said throttle arm in said one rotational direction, and means rotating said spark control arm, against said biasing means, in said opposite rotational direction relative to said throttle arm when said throttle arm is moved from said second position to said third position.

10. An internal combustion engine as set forth in claim 9 wherein said spark control arm includes a cam surface thereon, and wherein said means rotating said spark control arm includes a roller fixedly attached to said lever and engageable with said cam surface on said spark control arm.

11. A spark ignition internal combustion engine including a throttle valve, an exhaust valve, a spark timing device, and a control mechanism comprising a first linkage operatively connected to said throttle valve, a second linkage operatively connected to said exhaust valve, a third linkage operatively connected to said spark timing device, and means interconecting said first, second, and third linkages for providing coordinated control of said throttle valve, said exhaust valve, and said spark timing device, said means interconnecting said first, second, and third linkages including a pivot on the engine, a throttle arm pivotally connected to said pivot and rotatable in one rotational direction between first, second and third successive positions and operatively connected to said second linkage such that rotation of said throttle arm in said one rotational direction causes said exhaust valve to be increasingly opened from a minimum opening when said throttle arm is in said first position to a maximum opening when said throttle arm is in said third position, means operatively connecting said throttle arm to said first linkage such that rotation of said throttle arm in said one rotational direction causes said throttle valve to be increasingly opened from a minimum opening when said throttle arm is in said first position to a maximum opening when said throttle arm is in said third position, means for controlling the spark timing by advancing the spark timing from a minimum value to a maximum value as said throttle arm is moved from said first position to said second position, and by retarding the spark timing from said maximum value to a value less than said maximum value as said throttle arm is moved from said second position to said third position, said means for controlling the spark timing including a spark control arm pivotally connected to said pivot and operatively connected to said third linkage such that rotation of said spark control arm in said one rotational direction advances the spark timing and rotation of said spark control arm in the opposite rotational direction retards the spark timing, means preventing rotation of said spark control arm beyond said throttle arm in said one rotational direction, a helical spring wound around said pivot and having an end fixedly attached to said spark control arm so as to bias said spark control arm in said one rotational direction, means preventing rotation of said spark control arm beyond said throttle arm in said one rotational direction, and means rotating said spark control arm, against said helical spring, in said opposite rotational direction relative to said throttle arm when said throttle arm is moved from said second position to said third position.

12. A spark ignition internal combustion engine including a throttle valve, an exhaust value, a spark timing device, a reversible transmission, a pivotally mounted shift lever movable between forward, neutral, and reverse positions to actuate the transmission, and a control mechanism comprising a first linkage operatively connected to said throttle value, a second linkage operatively connected to said exhaust valve, a third linkage operatively connected to said spark timing device, and means interconnecting said first, second, and third linkages for providing coordinated control of said throttle valve, said exhaust valve, and said spark timing device, said means interconnecting said first, second, and third linkages including a pivot on the engine, a throttle arm pivotally connected to said pivot and rotatable in one rotational direction between first, second, and third successive positions, and operatively connected to said second linkage such that rotation of said throttle arm in said one rotational direction causes said exhaust valve to be increasingly opened from a minimum opening when said throttle arm is in said first position to a maximum opening when said throttle arm is in said third position, means operatively connecting said throttle arm to said first linkage such that rotation of said throttle arm is said one rotational direction causes said throttle valve to be increasingly opened from a minimum opening when said throttle arm is in said first position to a maximum opening when said throttle arm is in said third position, means for controlling the spark timing by advancing the spark timing from a minimum value to a maximum value as said throttle arm is moved from said first position to said second position, and by retarding the spark timing from said maximum value to a value less than said maximum value as said throttle arm is moved from said second position to said third position, said means for controlling the spark timing including a spark control arm pivotally connected to said pivot and operatively connected to said third linkage such that rotation of said spark control arm in said one rotational direction advances the spark timing and rotation of said spark control arm in the opposite rotational direction retards the spark timing, means biasing said spark control arm in said one rotational direction, means preventing rotation of said spark control arm beyond said throttle arm in said one rotational direction, and means for rotating said spark control arm, against said biasing means, in said opposite rotational direction relative to said throttle arm when said throttle arm is moved from said second position to said third position, and means interconnecting the shift lever and said spark control arm for moving said spark control arm in said opposite rotational direction so as to retard the spark timing to a value less than said minimum valve when the shift lever is in the neutral position.

13. An internal combustion engine as set forth in claim 12 wherein said means interconnecting said shift lever and said spark control arm includes a solenoid having an extendible and retractable solenoid arm pivotally connected to said spark control arm such that when said solenoid arm is retracted said spark control arm is moved so as to retard the spark timing to said value less than said minimum value, and a switch operable between open and closed positions and connected in an electrical circuit with said solenoid such that said solenoid arm retracts when said switch is closed, said switch being operably connected to the shift lever such that said switch is closed when the shift lever is in the neutral position and said switch is open when the shift lever is out of the neutral position.

14. A control device for a spark ignition internal combustion engine, the engine including a throttle valve, an exhaust valve, and a spark timing device, said control device comprising a first linkage adapted to be operatively connected to the throttle valve, a second linkage adapted to be operatively connected to the exhaust valve, a third linkage adapted to be operatively connected to the spark timing device, and means interconnecting said first, second, and third linkages for providing coordinated control of the throttle valve, the exhaust valve, and the spark timing device, said means interconnecting said first, second, and third linkages including, a first pivot on the engine, a throttle arm pivotally connected to said first pivot and rotatable in one rotational direction between first, second, and third successive positions, said throttle arm being operatively connected to said second linkage such that rotation of said throttle arm from said first position to said third position causes the exhaust valve to be increasingly opened from a minimum opening to a maximum opening, means operatively connecting said throttle arm to said first linkage such that rotation of said throttle arm from said first position to said third position causes the throttle valve to be increasingly opened from a minimum opening to a maximum opening, said means operatively connecting said throttle arm to said first linkage including a second pivot on the engine, a first lever having a cam surface and being pivotable about said second pivot, a link operatively connecting said first lever to said throttle arm such that rotation of said throttle arm in said one rotational direction causes said first lever to rotate about said second pivot, and a roller operatively connected to said first linkage and engaging said cam surface of said first lever, and means for controlling the spark timing by advancing the spark timing from a minimum value to a maximum value as said throttle arm is moved from said first position to said second position, and retarding the spark timing from said maximum value to a value less than said maximum value as said throttle arm is moved from said second position to said third position, said means for controlling the spark timing including a spark control arm pivotally connected to said first pivot and operatively connected to said third linkage such that rotation of said spark control arm in said one rotational direction advances the spark timing and rotation of said spark control arm in the opposite rotational direction retards the spark timing, said spark control arm including a cam surface thereon, means biasing said spark control arm in said one rotational direction, said biasing means including a helical spring wound around said first pivot and having an end fixedly attached to said spark control arm, means preventing rotation of said spark control arm beyond said throttle arm in said one rotational direction, and means rotating said spark control arm, against said biasing means, in said opposite rotational direction relative to said throttle arm when said throttle arm is moved from said second position to said third position, said means rotating said spark control arm including a roller fixedly attached to said first lever and engageable with said cam surface on said spark control arm.

15. A control device as set forth in claim 14 wherein the engine further includes a reversible transmission and a pivotally mounted shift level movable between forward, neutral, and reverse positions and adapted to actuate the transmission, and wherein said control device further comprises means interconnecting the shift lever and said spark control arm for moving said spark control arm in said opposite rotational direction so as to retard the spark timing to a value less than said minimum value when the shift lever is in the neutral position.

16. A control device as set forth in claim 15 wherein said means interconnecting said shift lever and said spark control arm includes a solenoid having an extendible and retractable solenoid arm pivotally connected to said spark control arm such that when said solenoid arm is retracted said spark control arm is moved so as to retard the spark timing to said value less than said minimum value, and a switch operable between open and closed positions and connected in an electrical circuit with said solenoid such that said solenoid arm retracts when said switch is closed, said switch being operably connected to the shift lever such that said switch is closed when the shift lever is in the neutral position and the switch is open when the shift lever is out of the neutral position.

17. A spark ignition internal combustion engine including a throttle valve, a spark timing device, and a control mechanism comprising means for providing coordinated control of said throttle valve and said spark timing device, said means including a pivot on the engine, a throttle arm pivotally carried by said pivot and being rotatable in one rotational direction between first, second, and third successive positions, a throttle control linkage including cam means operatively connecting said throttle arm to said throttle valve such that rotation of said throttle arm in said one rotational direction causes said throttle valve to be increasingly opened from a minimum opening when said throttle arm is in said first position to a maximum opening when said throttle arm is in said third position, and a spark timing control linkage connecting said throttle arm to said spark timing device and including means including said cam means for controlling the spark timing by advancing the spark timing from a minimum value to a maximum value as said throttle arm is moved from said first position to said second position, and by retarding the spark timing from said maximum value to a value less than said maximum value as said throttle arm is moved from said second position to said third position.

18. An internal combustion engine as set forth in claim 17 wherein said means for controlling the spark timing includes a spark control arm pivotally connected to said first pivot and operatively connected to said third linkage such that rotation of said spark control arm in said one rotational direction advances the spark timing and rotation of said spark control arm in the opposite rotational direction retards the spark timing, means biasing said spark control arm in said one rotational direction, means preventing rotation of said spark control arm beyond said throttle arm in said one rotational direction, and means rotating said spark control arm, against said biasing means, in said opposite rotational direction relative to said throttle arm when said throttle arm is moved from said second position to said third position.

19. A spark ignition internal combustion engine including a throttle valve, a spark timing device, and a control mechanism comprising a first linkage operatively connected to said throttle valve, a spark timing linkage operatively connected to said spark timing device, and means interconnecting said first and spark timing linkages for providing coordinated control of said throttle valve and said spark timing device, said means including a first pivot on the engine, a throttle arm pivotally connected to said first pivot and being rotatable in one rotational direction between first, second, and third successive positions, means operatively connecting said throttle arm to said first linkage such that rotation of said throttle arm in said one rotational direction causes said throttle valve to be increasingly opened from a minimum opening when said throttle arm is in said first position to a maximum opening when said throttle arm is in said third position, said means operatively connecting said throttle arm to said first linkage including a second pivot on the engine, a lever having a cam surface and being pivotable about said second pivot, a link operatively connecting said lever to said throttle arm such that rotation of said throttle arm in said one rotational direction causes said lever to rotate about said second pivot, and a roller operatively connected to said first linkage and engaging said cam surface of said lever, and means for controlling the spark timing by advancing the spark timing from a minimum value to a maximum value as said throttle arm is moved from said first position to said second position, and by retarding the spark timing from said maximum value to a value less than said maximum value as said throttle arm is moved from said second position to said third position, said means for controlling the spark timing including a spark control arm pivotally connected to said first pivot and operatively connected to said spark timing linkage such that rotation of said spark control arm in said one rotational direction advances the spark timing and rotation of said spark control arm in the opposite rotational direction retards the spark timing, means biasing said spark control arm in said one rotational direction, means preventing rotation of said spark control arm beyond said throttle arm in said one rotational direction, and means rotating said spark control arm, against said biasing means, in said opposite rotational direction relative to said throttle arm when said throttle arm is moved from said second position to said third position.

20. An internal combustion engine as set forth in claim 19 wherein said spark control arm includes a cam surface thereon, and wherein said means rotating said spark control arm includes a roller fixedly attached to said first lever and engageable with said cam surface on said spark control arm.

21. A spark ignition internal combustion engine including a throttle valve, a spark timing device, and a control mechanism comprising a first linkage operatively connected to said throttle valve, a spark timing linkage operatively connected to said spark timing device, and means interconnecting said first and spark timing linkages for providing coordinated control of said throttle valve and said spark timing device, said means including a pivot on the engine, a throttle arm pivotally connected to said pivot and being rotatable in one rotational direction between first, second, and third successive positions, means operatively connecting said throttle arm to said first linkage such that rotation of said throttle arm in said one rotational direction causes the throttle valve to be increasingly opened from a minimum opening to a maximum opening, said throttle valve being at minimum opening when said throttle arm is in said first position and being at maximum opening when said throttle arm is in said third position, and means for controlling the spark timing by advancing the spark timing from a minimum value to a maximum value as said throttle arm is moved from said first position to said second position, and by retarding the spark timing from said maximum value to a value less than said maximum value as said throttle arm is moved from said second position to said third position, said means for controlling the spark timing including a spark control arm pivotally connected to said pivot and operatively connected to said spark timing linkage such that rotation of said spark control arm in said one rotational direction advances the spark timing and rotation of said spark control arm in the opposite rotational direction retards the spark timing, a helical spring would around said pivot and having an end fixedly attached to said spark control arm so as to bias such spark control arm in said one rotational direction, means preventing rotation of said spark control arm beyond said throttle arm in said one rotational direction, and means for rotating said spark control arm, against said helical spring, in said opposite rotational direction relative to said throttle arm when said throttle arm is moved from said second position to said third position.

22. A spark ignition internal combustion engine including a spark timing device, a reversible transmission, a pivotally mounted shift lever movable between forward, neutral, and reverse positions to actuate said transmission, and a control mechanism comprising a spark timing linkage operatively connected to said spark timing device, a pivot on the engine, a spark control arm pivotally connected to said pivot and operatively connected to said spark timing linkage such that rotation of said spark control arm in one rotational direction advances the spark timing and rotation of said spark control arm in the opposite rotational direction retards the spark timing, and means interconnecting said shift lever and said spark control arm for moving said spark control arm in said opposite rotational direction so as to retard the spark timing when said shift lever is in the neutral position.

23. An internal combustion engine as set forth in claim 22 wherein said means interconnecting said shift lever and said spark control arm includes a solenoid having an extendible and retractable solenoid arm pivotally connected to said spark control arm such that when said solenoid arm is retracted said spark control arm is moved so as to retard the spark timing, and a switch operable between open and closed positions and connected in an electrical circuit with said solenoid such that said solenoid arm retracts when said switch is closed, said switch being operably connected to the shift lever such that said switch is closed when the shift lever is in the neutral position and said switch is open when the shift lever is out of the neutral position. /

* * * * *